Jan. 4, 1966 J. W. DELMEGE, JR., ETAL 3,228,005
APPARATUS FOR MANIPULATING DATA ON A BYTE BASIS
Filed Dec. 30, 1960 12 Sheets-Sheet 8

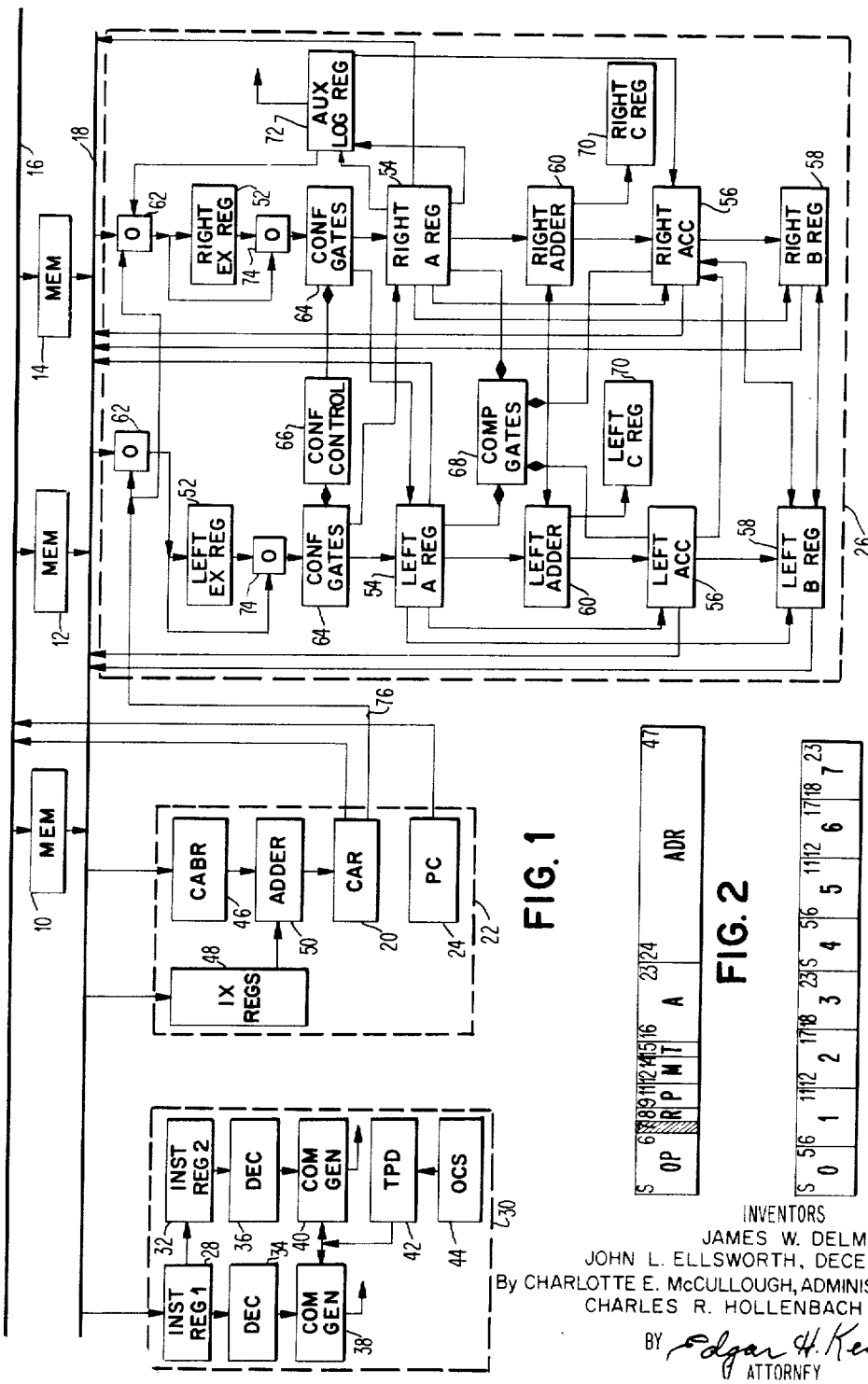

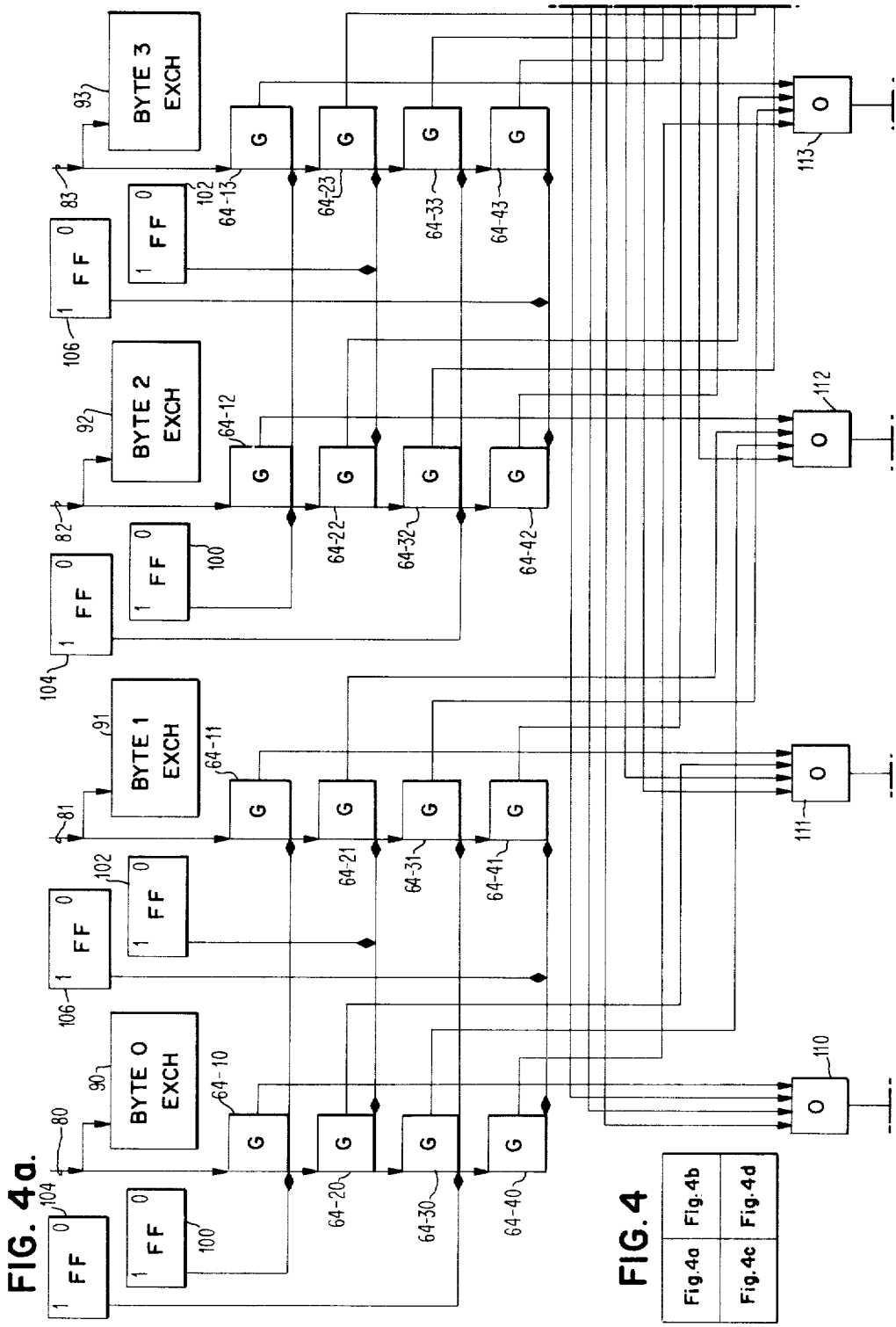

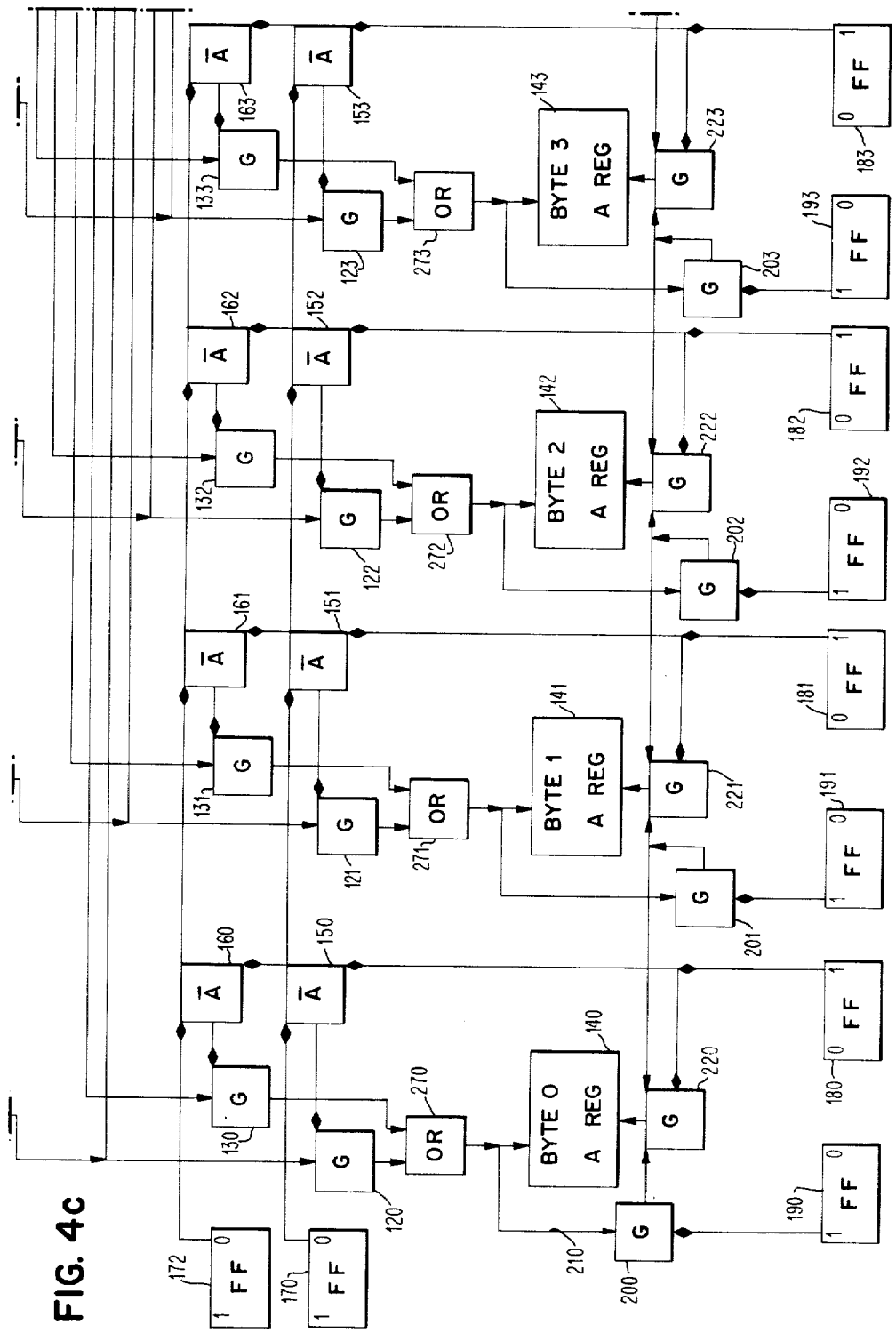

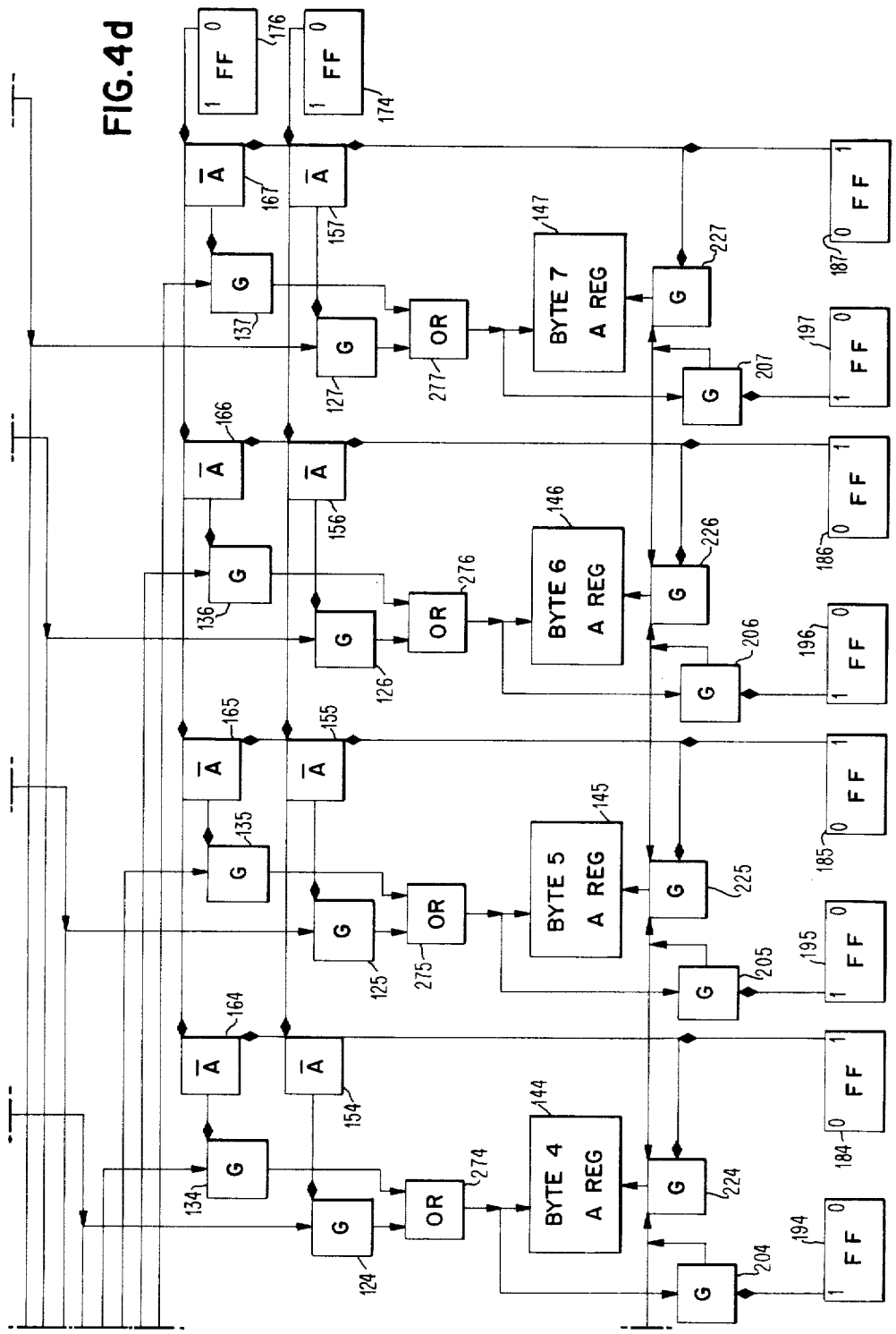

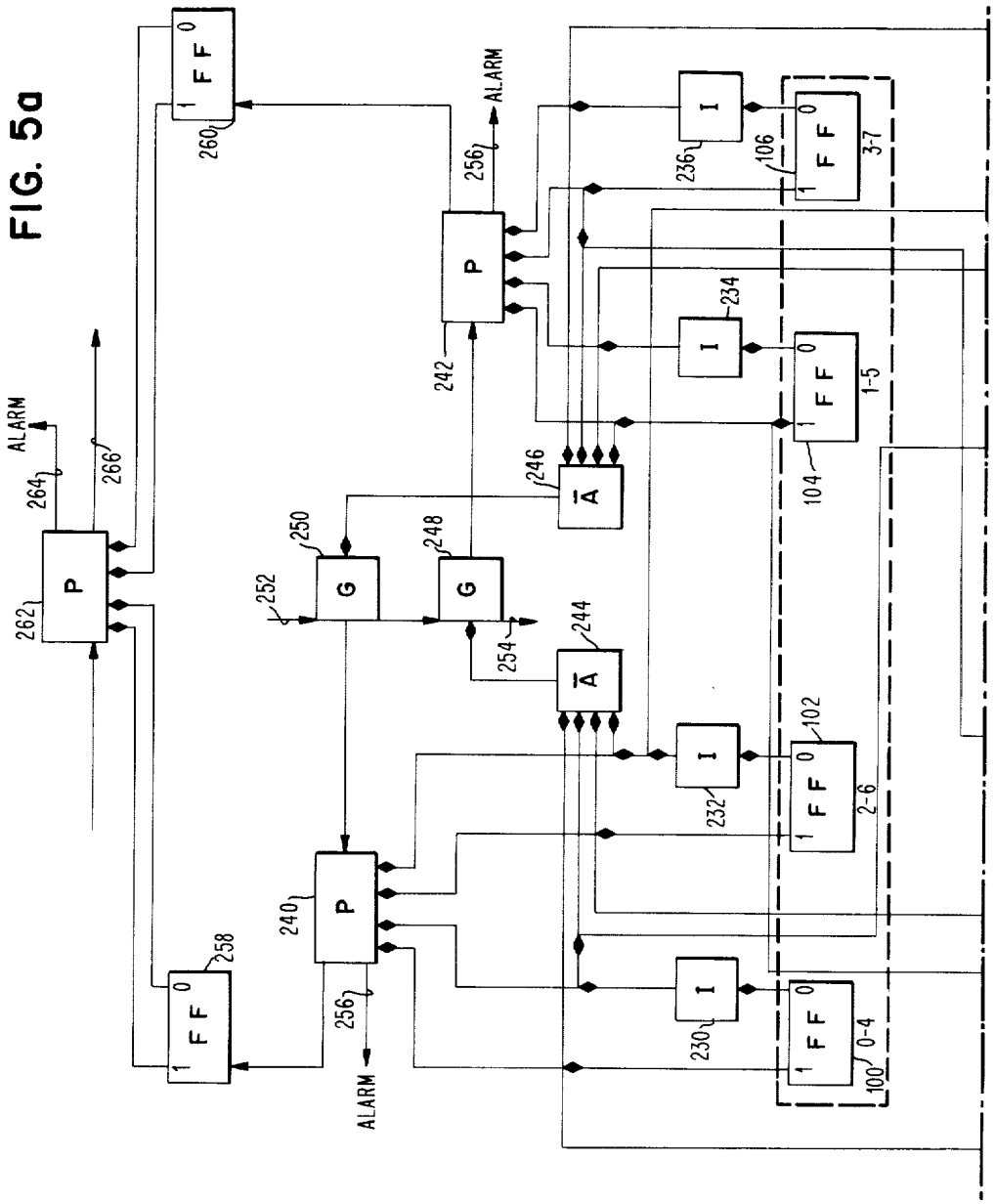

FIG. 6

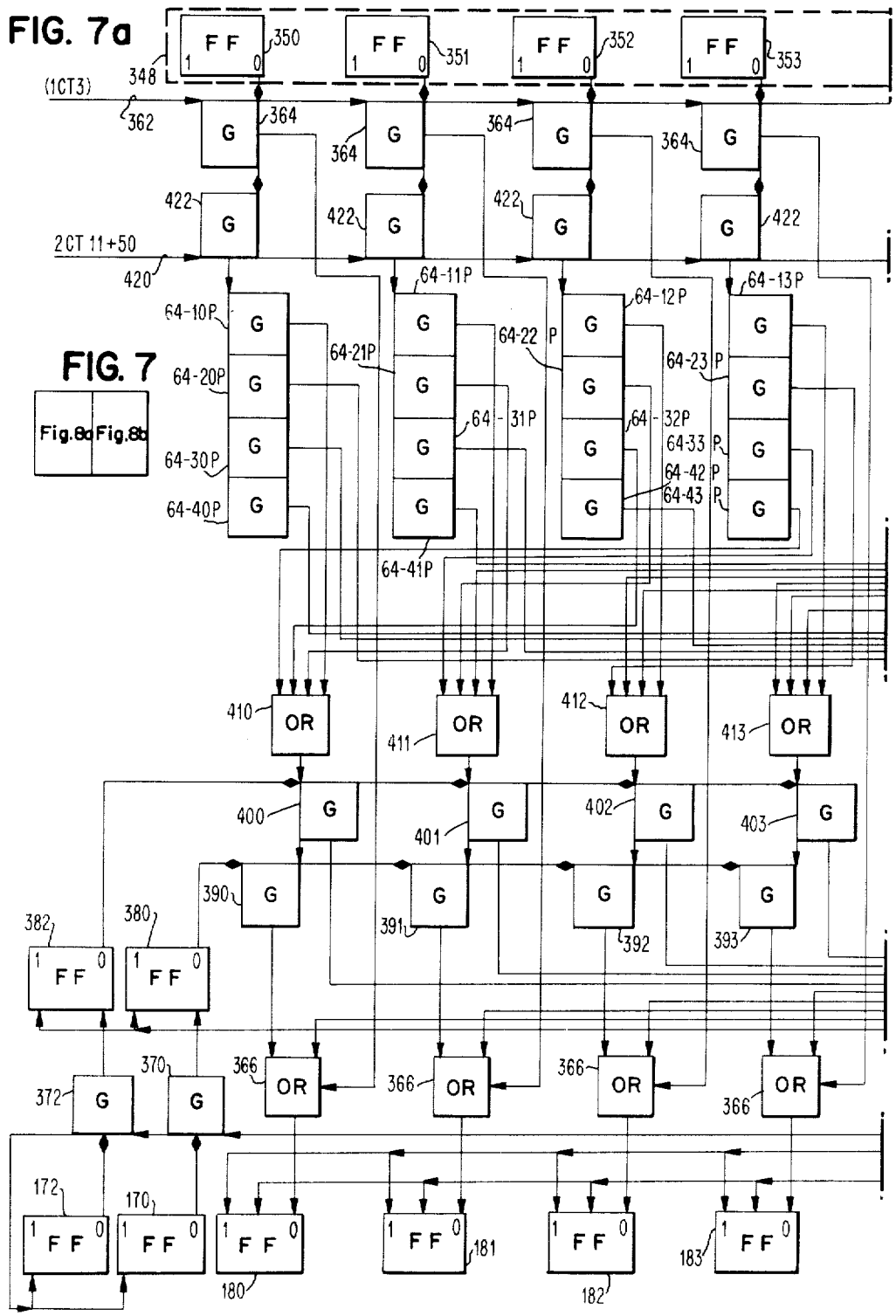

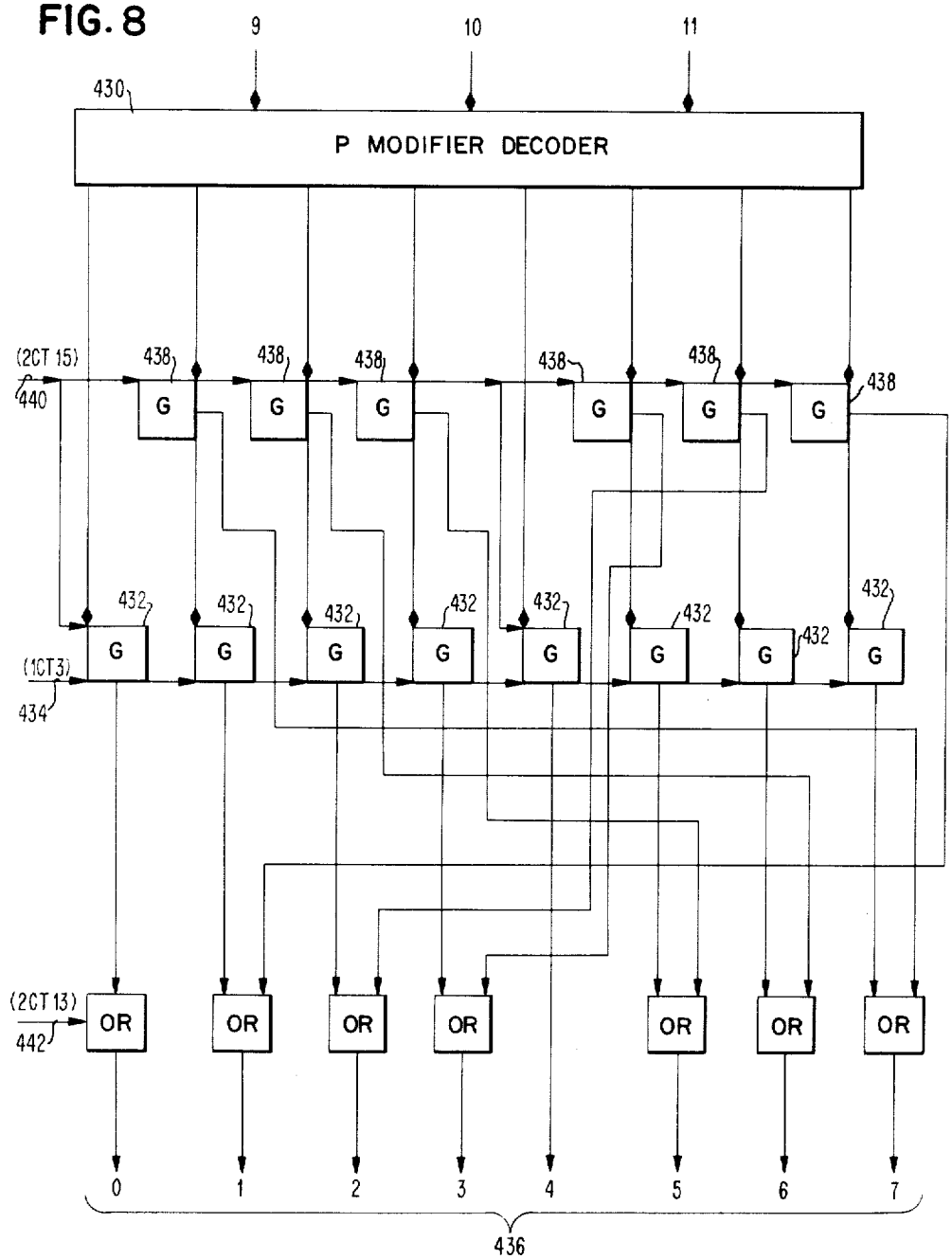

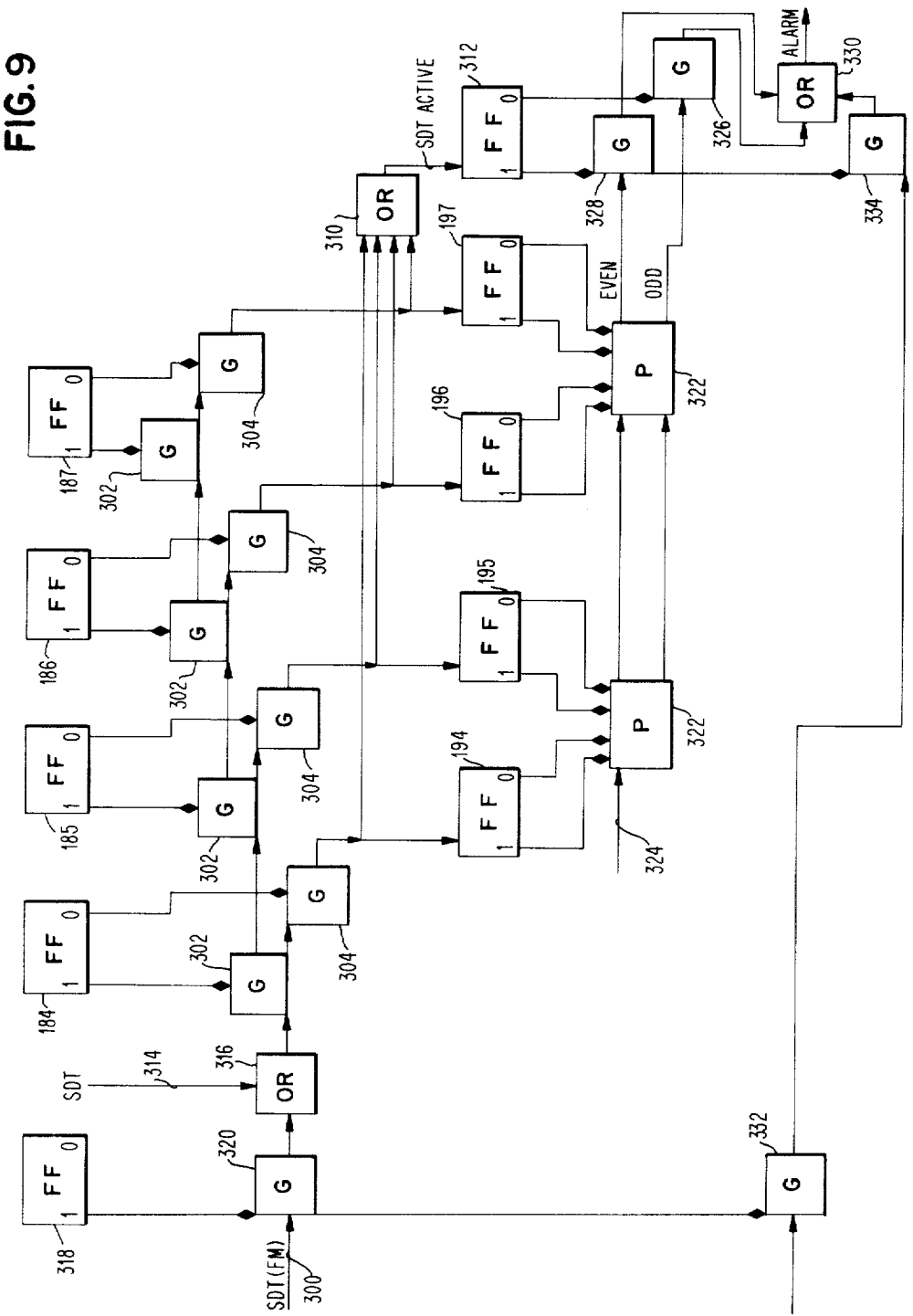

United States Patent Office 3,228,005
Patented Jan. 4, 1966

3,228,005
APPARATUS FOR MANIPULATING DATA
ON A BYTE BASIS
James W. Delmege, Jr., and Charles R. Hollenbach, Saugerties, N.Y., John L. Ellsworth, deceased, late of Kingston, N.Y., by Charlotte E. McCullough, administratrix, Southboro, Mass., assignors to International Business Machines Corporation, New York, N.Y., a corporation of New York
Filed Dec. 30, 1960, Ser. No. 79,928
29 Claims. (Cl. 340—172.5)

This invention relates to digital computers and similar types of machines useful for computation, data processing and related functions and more particularly to improved data manipulation apparatus useful in such machines.

Many digital computers are designed to handle data words of substantial length both to provide sufficient data handling capabilities and to provide adequate flexibility of operations in response to the instructions commensurate with the design and application of the machine. However in such machines data items handled are often only a fraction of the total available space in a word and therefore it is unduly wasteful of the available space in the memory to store a single such item in individual word areas. Typical of such items are constants, frequently used both in data processing and in computation, which may include a sign value. In the preferred embodiment of the invention the data word length is forty-eight bits whereas constants that find frequent use are six bits or less in length. These short data items (six bits) are herein termed bytes. In addition to advantages of more efficient storage bytes of this size find use in many data manipulation operations including convert operations which involve translating to or from binary coded Hollerith (BCD) for example.

Accordingly, it is an object of this invention to provide apparatus for rapidly manipulating data items on a byte basis for efficient and flexible operations in a digital computer arithmetic element.

Another object of this invention is to provide improved apparatus for enabling fractional words to be stored in groups, for example in a single word in memory, and to be easily and rapidly manipulated in response to instruction tags so as to be available for proper use in the arithmetic element of a computer.

Still another object of the invention is to provide improved data manipulation apparatus.

Another object of the invention is to provide an improved digital computer arithmetic element in which data items may be selectively cycled in a flexible manner during transfers between the several registers in the arithmetic element.

A further object is to provide an improved digital computer arithmetic element which is capable of performing data manipulations in Twin Mode with versatility.

Still another object of the invention is to provide an integrated data translation system in which selected data portions may be rapidly and accurately manipulated in an optional and selective manner in high speed digital computers such that the overall speed of the digital computer system is not reduced.

A further object of the invention is to provide data manipulation circuitry capable of replacing or modifying specified bytes in a data word in response to a single instruction.

The preferred embodiment of the invention is incorporated in a computer which has a 2.496 microsecond machine cycle and handles instruction and data words, each being forty-eight bits in length (plus two parity bits). The Arithmetic Element of this computer is arranged so that selected portions of data words can be manipulated or configured on a byte (six bit) basis. The bytes in each data word are loaded directly into a first register in the Arithmetic Element and simultaneously may be cycled for positioning as desired in a second register in accordance with information tags associated with the instruction. The apparatus also includes the facility to mask or inhibit loading of certain of these bytes into the second register in accordance with information associated with the instruction. Further, provision is made for adjusting the word as configured in the Arithmetic Element in accordance with the sign of the active (unmasked) data bytes in response to instruction tag information. In addition replacement or modification of specific bytes in the data word in response to single instructions is enabled by the apparatus of the invnetion. Complete checking circuitry is also provided to supervise these operations.

The Arithmetic Element of the preferred embodiment of the invention incorporates a so-called Exchange Register at the input to the Arithmetic Element into which the data word is loaded in the form in which it was transferred. Simultaneously the data bit values are applied to a channeling or configuration matrix which is conditioned typically in accordance with instruction tag information. This matrix is a two level arrangement which enables further flexibility in certain of the mode operations of the Arithmetic Element. When the data bits have passed through this matrix they have been cycled, on a byte basis, and in that form they are applied through input gates to the A Register. The cycled bytes are loaded into that Register in accordance with activity modifier bits of the instruction which determine which of the cycled bytes are to be loaded into the A Register. Thus, specific bytes of six bits each are positioned as desired in the forty-eight bit A Register of the Arithmetic Element for the subsequent manipulation or computation operations. A further feature of the apparatus relates to the control and adjusting of the values of certain bytes where sign information is significant. As each of the bytes may have a sign indicator associated therewith, as for example, signed constants, it is necessary to appropriately correct the values of the inactive bytes when those indicators have significance so that the adder circuitry in the Arithmetic Element will function properly. Indication that sign information has significance is provided by an instruction word tag. The circuitry also enables a selected byte or bytes to be cycled to an appropriate location in the A Register, for an arithmetic operation, and after that operation is performed to be replaced in their original location in the data word, all in response to a single instruction. In addition to the data manipulation circuitry the preferred embodiment also includes circuitry for checking these data manipulation operations. It will be seen as the following detailed description of the preferred embodiment of the invention progresses that the invention provides a novel and improved data word channeling apparatus and checking circuitry particularly adapted for use in the Arithmetic Element of a digital computer. In addition, certain other objects, features and advantages of the invention will appear from the detailed description taken in conjunction with the drawings, in which:

FIG. 1 is a block diagram of the computer apparatus which incorporates the preferred embodiment of the invention;

FIG. 2 is a diagrammatic layout of an instruction word of the type used in the computer shown in FIG. 1;

FIG. 3 is a diagrammatic layout of a data word illustrating the arrangement of bytes;

FIG. 6 is a logical block diagram of one byte of the A Register and associated transfer control and checking circuitries;

FIG. 8 is a logical block diagram of the P modifier decoder and associated circuitry; and FIG. 9 is a logical block diagram of the activity flip-flops associated with right half words and associated SDT error checking circuitry.

Figure 4B:
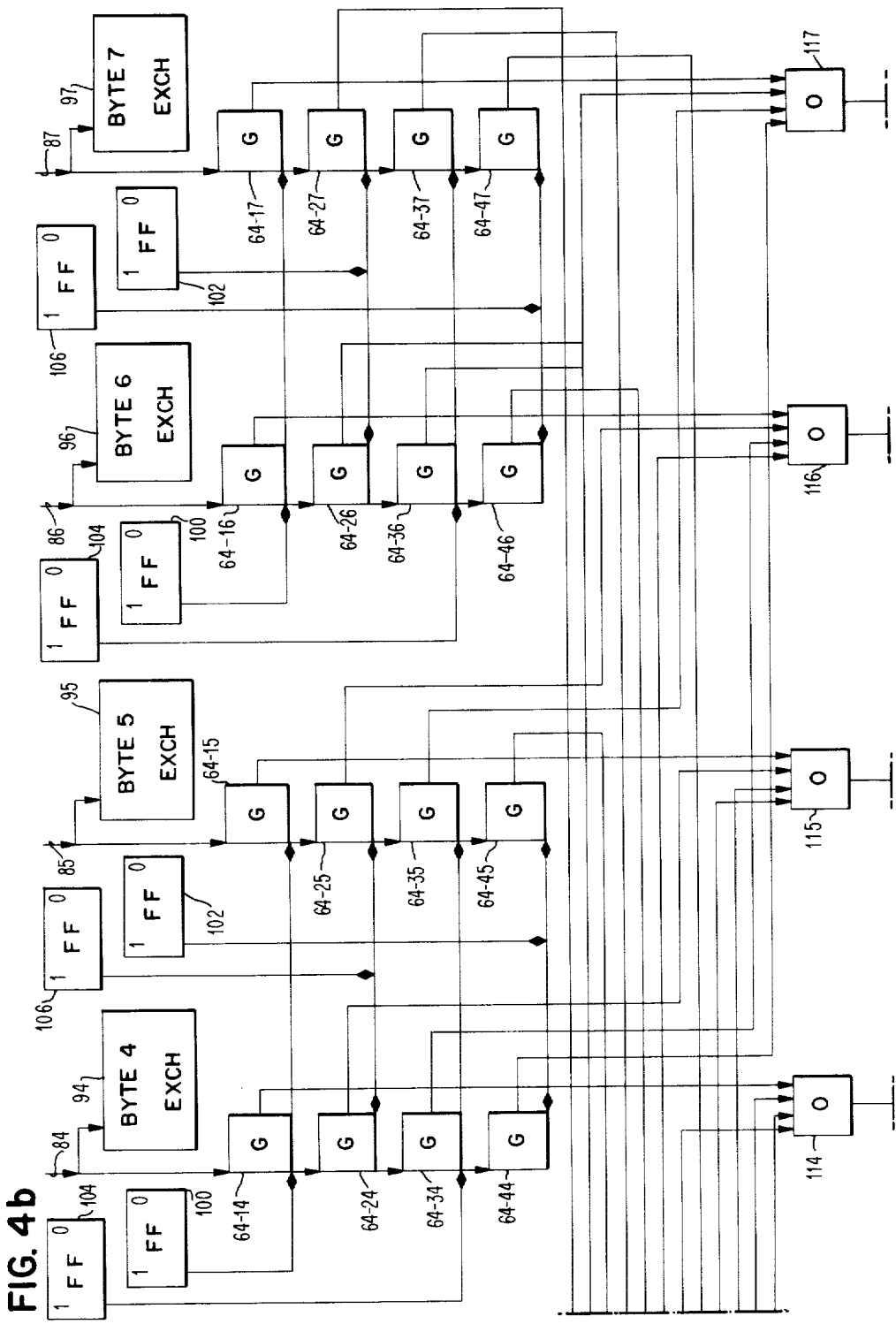
FIG. 4 illustrates the arrangement of FIGS. 4a-d which show a generalized logical block diagram of the configuration control circuitry of the invention and associated registers.

In the figures of the drawings a conventional filled-in arrowhead is employed on lines to indicate (1) a circuit connection, (2) energization with a pulse and (3) the direction of pulse travel. A diamond-shaped arrowhead indicates (1) a circuit connection, (2) energization with a D.C. level, and (3) the direction of application of that level. Boldface characters appearing within a block identify the common name of the circuit represented, that is, FF designates a flip-flop, G a gate circuit, OR a logical OR circuit, $\bar{A}$ a logical NOT AND circuit, P a parity check circuit, etc. A variety of circuits suitable for the performance of each of these functions is known in the art. However, specific examples of suitable components are disclosed in the copending application S.N. 824,119 filed in the name of Carroll A. Andrews et al. on June 30, 1959 and entitled Magnetic Core Transfer Matrix (IBM Docket 13075). The basic arrangement of computer logic is similar to that of the computer system disclosed in U.S. Patent No. 2,914,248, issued to H. D. Ross et al. on November 24, 1959.

The computer system in which the preferred embodiment of the invention is employed is shown in FIG. 1 in general block form. That computer utilizes a plurality of Memory elements, three of which 10, 12, 14 are shown. Associated with each memory element is a Memory Address Register and a Memory Buffer Register (not shown). There is also provided a memory read-in bus 16 and a memory read-out and transfer bus 18. The computer system is designed to permit overlapped or concurrent processing of two instructions and thus is arranged so that two memories may be utilized by the computer at the same time. The data word for one instruction may be withdrawn from one Memory in accordance with information stored in the Central Address Register (CAR) 20 (in the Program Control Element 22) at the same time that the next instruction word is read out of another Memory in accordance with the information from the Program Counter (PC) 24. In normal overlap operation a data word is transferred to the Arithmetic Element 26 while portions of an instruction word are substantially simultaneously transferred in skew fashion to the First Instruction Register 28 in the Instruction Control Element 30 and to registers in the Program Control Element 22. The Instruction Control Element is shown in simplified form as including First and Second Instruction Registers 28, 32. Associated with these registers are Decoders 34, 36, Command Generators 38, 40 and a Timing Pulse Distributor 42 (driven by Oscillator 44) by means of which are generated control signals so that appropriate commands may be channeled throughout the entire computer to execute each instruction. In this computer sixteen timing pulses spaced at intervals of one hundred fifty-six millimicroseconds are generated during each machine cycle. While the instruction is in first level decoding (in Instruction Register 28) in general the necessary control circuitries are set up and requisite address modification operations are performed in the Program Control Element. The operand is normally transferred from the First Instruction Register 28 to the Second Instruction Register 32 at the end of the first machine cycle so that those commands necessary for the execution of an instruction (which typically involves the manipulation of data in the Arithmetic Element) may be generated. Additional information on the Instruction Control Element (which is shown in simplified form here) and on the overlapped mode of operation of this type may be obtained by reference to the copending application, S.N. 823,988 (IBM Docket 13076) filed in the name of J. D. Newton on June 30, 1959, and entitled "Data Processing Machine" which discloses a prototype system in that instruction and data word length in that system is twenty bits plus a parity bit. In the Program Control Element 22 the address portion of the instruction as loaded into the Central Address Buffer Register 46 may be modified with the contents of an Index Register 48 through use of Adder 50 and loaded into Central Address Register 20. In addition, the modification of the contents of internal storage registers are performed and the general control of the sequence of instructions is supervised by this element. Additional information on the details and operation of this element (which is shown here in simplified form) may be obtained with reference to the copending application IBM Docket 13124 filed in the name of R. J. Pulver, Jr. on June 30, 1960, Serial No. 39,879, entitled Program Control Element.

The Arithmetic Element is used, among other things, for computations involving addition, subtraction, multiplication and division, for comparison and modification of selected information within a specified memory word, and for the shifting, cycling and normalizing of data words contained therein. Each of these operations is accomplished by sequenced commands generated by and channeled from the Instruction Control Element 30. The Arithmetic Element 26 is essentially composed of two substantially identical sections, each of which contains a twenty-four bit Exchange Register 52, and corresponding A Registers 54, Accumulator Registers 56, B Registers 58, and Adder Circuitries 60 and miscellaneous storage, comparison and checking circuitries. In accordance with instruction tag bits, data words may be loaded into this Arithmetic Element for processing on a full word basis, on a half word basis (either left or right half word) in Dual mode or in Twin mode. As indicated in FIG. 1 input data can be transferred into the Arithmetic Element from the memory bus 18 and from the Program Control Element 22. Each incoming data word is applied through OR circuits 62 to the Exchange Register 52 and simultaneously through Configuration Gates 64 which are under the supervision of the Configuration Control Element 66 to the A Registers 54. Information supplied to the Configuration Control Element from the Instruction Control Element enables the cycling or shifting on a byte (six bits) basis, of the word loaded into the Exchange Registers and being simultaneously transferred to the A Registers. Also incorporated in the Arithmetic Element and shown in FIG. 1 are Comparison Gates 68, C (check) Registers 70, an Auxiliary Logic Register 72, and OR transfer circuits 74.

A layout of a typical instruction word, which, inter alia, controls transfer of data through the Configuration Gates 64 to the A Register 54 is shown in FIG. 2. The instruction word is a forty-eight bit word (bits S and 1–47) plus a parity bit (not indicated) associated with each twenty-four bit half word. Bits S–6 are the operand portion, bit 8 is the Real Data tag (R), bits 9–11 are the Byte Displacement (P) modifier, bits 12–14 are the Mode (M) modifier, bit 15 is a Signed Data Tag (T), bits 16–23 are the Byte Activity (A) modifier, and bits 24–47 are the address portion of the instruction. Bits S–23 are loaded into the Instruction Control Element 30 and bits 24–47 are loaded into the Program Control Element 22. The seven bits of the operand are decoded and set up circuitry in the Command Generators which enables the generation of commands in accordance with timing pulses from the Timing Pulse Distributor for the execution of the instruction. The Read Data Tag bit 8 is a control bit which, when ONE, enables the address portion of the instruction (bits 24–47) to be transferred directly to the Arithmetic Element 26 from the Central Address Register 20 (over line 76) for processing in Dual mode, instead of specifying the address of the data in memory that is to be processed in accordance with the instruction as is the conventional case. Bits 9–11 are the Byte Displacement modifier and specify the number of byte positions that the data word loaded into the Arithmetic Element is to be shifted to the right by the Configuration Control circuitry. The data word arrangement illustrating the byte configuration is shown in FIG. 3. As shown in that figure the forty-eight bit data word has eight bytes (0–7) of six bits each. The word is transferred into the Arithmetic Element in two half word portions and associated with each half word is a parity bit. This word is transferred through the OR circuits 62 and loaded directly into the Exchange Registers 52. At the same time it is applied to the Configuration Gates 64 and information supplied through the Configuration Control 66 as conditioned in accordance with the Byte Displacement (P) modifier (bits 9–11) determines the number of byte positions that the word is to be cycled to the right for loading into the A Register 54. If the P modifier was zero (000) the byte configuration in the A Register would be the same as in the Exchange Register while if the P modifier was seven (111) the word in the A Register would be effectively cycled one byte to the left with respect to the word in the Exchange Register with byte 0 being shifted to the byte 7 location. The M modifier (bits 12–14) is the mode modifier and controls whether the data word is to be processed in full mode (000); left mode (001) in which an instruction operation is executed in the left half of the arithmetic element only; right mode (010) in which instruction operation occurs in the right half only; dual mode (011) which allows each half word to be treated independently with operations occuring simultaneously in both halves of the Arithmetic Elements; and twin mode (100) which allows the left half of the data word to be acted upon in both halves of the Arithmetic Element simultaneously and independently. The T modifier (bit 15) is the Signed Data tag which provides means for setting all the bits of each inactive byte of the configured word in the A Register to ones in accordance with the selected mode where that tag is active and the sign bit of each most significant byte is negative. Bits 16–23 are the activity modifier and specify which of the displaced bytes of configured word are to take an active part in the arithmetic operation. Bit 16 refers to byte 0, bit 17 refers to byte 1 and so forth. The corresponding byte in the A Register is active if the activity bit is 0 and it is inactive if the activity bit is 1. When inactive all the bits in that byte remain set in the ZERO state. While the byte configuration of the data word is illustrated in FIG. 3 as two half words each consisting of a sign bit S and 23 data bits it will be understood that the operand may be a full word consisting of a single sign bit S and 47 data bits. These words are processed in the Arithmetic Element with negative numbers indicated in 1's complement form. The sign bit is ZERO if the number is positive and ONE if the number is negative.

A more detailed logical block diagram of the Configuration Control circuitry and the associated flip-flops of the Exchange Register and the A Register is shown in FIG. 4. As indicated above the data word transferred to the Arithmetic Element is applied over lines 80–87 simultaneously to the flip-flop blocks 90–97 of the Exchange Register 52 and to the Configuration Gates 64. In FIG. 4 each set of byte flip-flops is indicated by a single block 90–97. It will be understood that in each block there are six data flip-flops. Similar symbols are utilized for other logic elements shown in FIG. 4. In these byte groups the last digit of the associated reference numeral is the byte number. Thus Exchange Register flip-flops 90 are the byte 0 flip-flops, flip-flops 91 byte 1, etc.

The Configuration Gates 64 are conditioned by sets of Displacement Control flip-flops 100, 102, 104 and 106. A set of these flip-flops is associated with each pair of bytes and the corresponding flip-flops in each set normally are placed in the same state in response to signals from the Instruction Control Element in accordance with the P modifier during first level decoding of the instruction. Byte displacement can be controlled other than by the P modifier however. The Displacement Control flip-flops 100 condition Configuration Gates which are connected to provide a displacement of zero or four bytes; the Displacement Control flip-flops 102 are connected to gates which provide a displacement of one or five bytes; the Displacement Control flip-flops 104 provide a displacement of two or six bytes; and the Displacement Control flip-flops 106 provide a displacement of three or seven bytes.

The outputs of the Configuration Gates 64 are applied through OR circuits 110–117 to the input gates 120–127 and 130–137 associated with the A Register flip-flops 140–147. For example, byte 0 data is applied on lines 80 and if flip-flop 100 is set a conditioning level is applied to the upper gates 64–10 so that the signals applied on lines 80 are passed through OR circuits 110 to sample the gates 120 and the gates 134. Similarly if flip-flop 104 has been set gates 64–30 would be conditioned and the signals applied on lines 80 would be passed through OR circuits 112 to sample gates 122 and 136.

Controlling the input to the A Register flip-flops 140–147 are NOT AND circuits 150–157 which have output levels that condition gate 120–127 and NOT AND circuits 160–167 which have output levels that condition gates 130–137. The NOT AND circuits 150–153 have a first input that is supplied from a ZERO displacement flip-flop 170 while the NOT AND circuits 160–163 have a first input from the FOUR displacement flip-flop 172, the NOT AND circuits 154–157 have a first input from the ZERO displacement flip-flop 174 and the NOT AND circuits 164–167 have a first input from the FOUR displacement flip-flop 176. Thus there are two effective levels of displacement control, the first supplied by flip-flops 100, 102, 104 and 106; and the second by flip-flops 170, 172, 174 and 176. Second inputs to the NOT AND circuits are supplied from the activity flip-flops 180–187 which are normally controlled by signals from the Instruction Control Element in accordance with the A modifier values. Thus if byte 0 is active, as indicated by bit 16 of the A modifier being ZERO, flip-flop 180 applies a positive level to the NOT AND circuits 150 and 160. Assuming that first level displacement flip-flop 100 is set and the ZERO displacement flip-flop 170 is set gates 120 are conditioned as NOT AND circuit 150 has a conditioning output (both inputs being up) and data on lines 80 is transferred through gates 64–10 and OR circuit 110 into byte 0 flip-flops 140 of the A Register. However if the FOUR displacement flip-flops 172 and 176 had been set gates 120 would not have been conditioned but gates 134 would be conditioned and (assuming activity flip-flop 184 was cleared indicating activity) the data transferred over line 80 would be displaced four bytes to the right and loaded into the A Register byte 4 flip-flops 144.

In another example of configuration assume the byte displacement value is five (P modifier 101) and the entire A Register is active (A modifier all ZEROS). In this case the displacement flip-flops 102, 172 and 176 will be set and all the activity flip-flops 180–187 will be cleared. The data byte transferred over lines 81, for example, will be passed through gates 64–21 and OR circuits 112 to sample gates 122 and 136. As flip-flop 170 is not set the NOT AND circuit 152 does not provide a conditioning level for gates 122 but flip-flop 176 being set enables NOT AND circuit 166 to provide a conditioning level so that gates 136 are conditioned and the data byte from lines 81 is loaded into byte 6 (flip-flops 146) of the A Register.

While normally both ZERO displacement flip-flops 170, 174 or both FOUR displacement flip-flops 172, 176 are set, the circuitry enables configuration and twinning at the same time by setting either flip-flops 170 and 176 or flip-flops 172 and 174. In this manner the same displaced half word is loaded into both halves of the A Register.

For example, the signals from OR circuits 112 are applied to gates 122 and 136. If the ZERO displacement flip-flop 170 and the FOUR displacement flip-flop 176 are set both gates are conditioned (assuming corresponding byte activity) and the byte transferred through OR circuits 112 is simultaneously loaded into A Register bytes 2 and 6. For twin mode, it is normal that each half word has the same byte activity specified by the A modifier. This is not required however if a True Twin condition is not desired and thereby the apparatus affords the programmer additional flexibility. In other words an instruction may specify twin mode and different byte activity for the two half words and thus two distinct values may be loaded into the two portions of the A Register and simultaneously manipulated in accordance with the instruction. It will thus be seen that this configuration and entry gate arrangement provides a powerful tool for the programmer.

The Signed Data control flip-flops 190–197 are also shown in FIG. 4. When a Signed Data (SDT) operation is specified (instruction bit 15 is ONE) the activity flip-flops 180–187 are serially sensed on a full word or half word basis depending on the setting of the mode modifier and each leftmost active byte gates the sampling pulse to set the associated SDT flip-flop 190–197. A set SDT flip-flop applies a conditioning level to the associated gates 200–207 respectively. This operation is set up prior to the transfer of data into the Arithmetic Element. Preference is accorded the sign bit of each byte (the data word being applied to the configuration circuitry in skew fashion from memory rather than passing through a Memory Buffer Register) and it is applied over lines 210–217 to sample gates 200–207. If the sign bit is ONE (indicating negative sign value of the byte) and the sampled gate is conditioned by the SDT flip-flop output level the pulse is passed to sample all of the gates 220–227. These gates are arranged to be conditioned by ONE levels from the activity flip-flops which indicate that the associated byte is inactive. Thus, if on a full word basis the first detected active byte was byte 1 SDT flip-flop 191 would be set and a conditioning level applied to gate 201. If the sign bit of the data byte transferred into byte 1 of the A Register was ONE (negative) a pulse applied to gate 201 over line 211 would be passed by that gate and would sample all the gates 220–227. As gate 220 is conditioned (byte 0 inactivity being indicated by flip-flop 180) the sampling pulse is passed to effectively complement all the data flip-flops 140 in A Register byte 0 from the ZERO state to the ONE state by applying the pulse to the ONE inputs. A similar operation occurs at all the other inactive bytes. This operation thus sets all the bits of each inactive byte of the configured operand to ONE's where the active sign of the modified operand indicates that the active word portion is negative so that arithmetic operations involving carry propagation may be properly carried out.

Figure 5B:
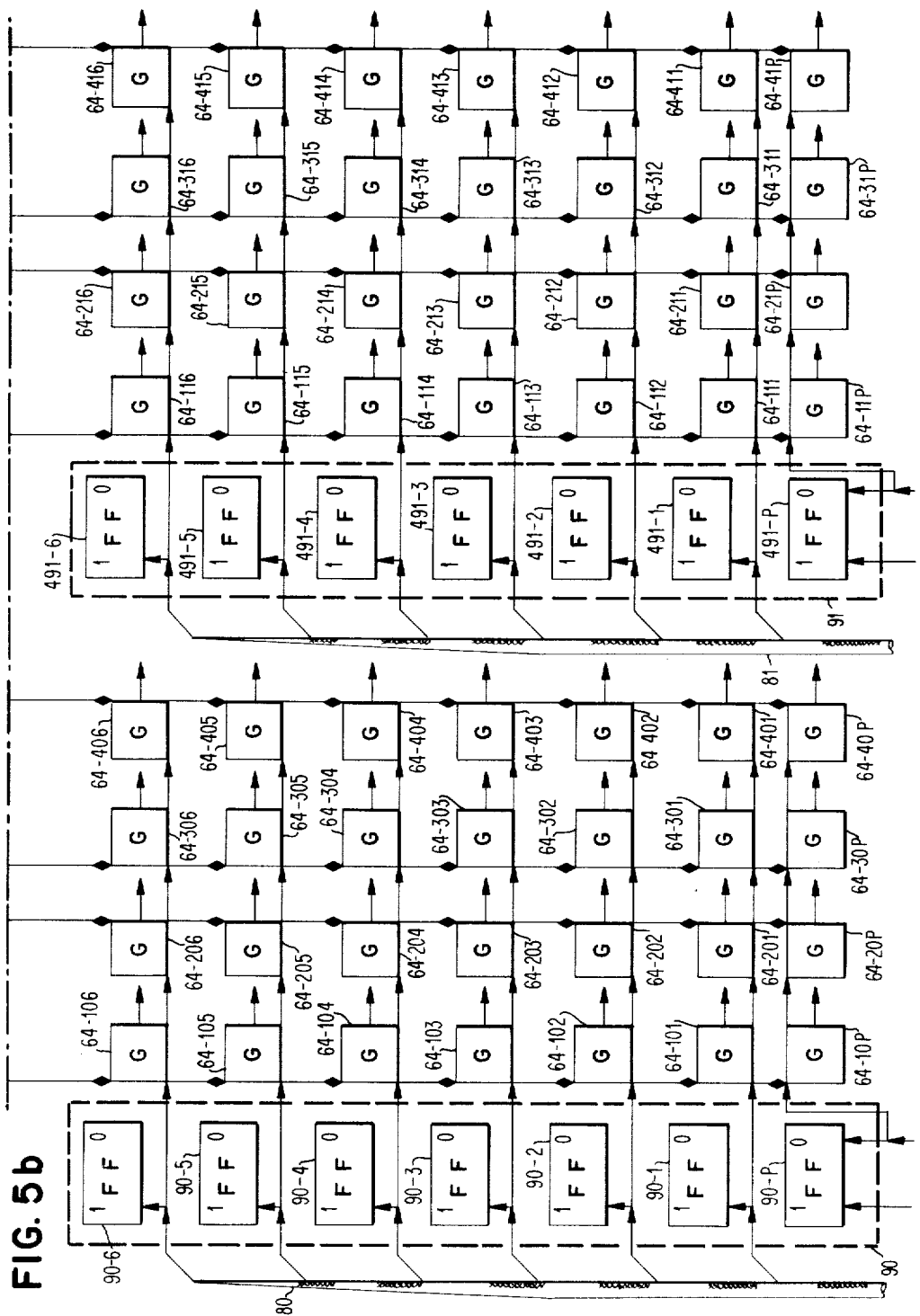
FIG. 5 is a logical block diagram of a portion of the Exchange Registers, the Configuration Gates, Displacement Control flip-flops and associated checking circuitry.

A more detailed logical block diagram of a portion of the Configuration Gates and the error checking circuitry associated therewith is shown in FIG. 5. In that figure there are shown the six data flip-flops 90–1, 6 together with the associated parity flip-flop 90–P in the Exchange Register byte 0 and the flip-flops 91–1, 6 and the parity flip-flop 91–P, of the Exchange Register byte 1. Also shown in FIG. 5 are the Configuration Gates associated with bytes 0 and 1. The reference numerals applied to these gates also corresponds to the reference numeral scheme applied to the circuitry shown in FIG. 4, with the addition of an additional numeral to differentiate the individual bit elements. Thus the Configuration Gates sampled by bit 1 of byte 0 are numbered 64–101, 64–201, 64–301 and 64–401.

The byte 0 data values applied over lines 80 sample the Configuration Gates and are simultaneously applied to the Exchange Register flip-flops 90. The gates are conditioned by levels from the Displacement control flip-flops 100, 102, 104, 106. It will be noted that output levels from the Displacement control flip-flop 100 when it is set are applied from the ZERO side through inverters 230, 232, 234, 236 to condition the 64–11 gate (byte 1). The other flip-flops 102, 104, 106 similarly condition their associated gates. It will be understood that throughout this circuitry other circuit arrangements may be utilized. For example, if sufficient driving capability is provided by the flip-flop a single level could be utilized to drive or condition all twelve gates and, alternatively, a suitable inverter having a double output could be used on the ZERO side of the flip-flop to condition both sets of associated gates.

The checking circuitry associated with this portion of the Configuration Control is shown in the upper portion of FIG. 5. Similar error check circuitry is associated with bytes 2 and 3, 4 and 5, and 6 and 7. In this checking circuitry the gate conditioning levels are applied as imputs to parity (P) circuits 240, 242 of the type disclosed in the copending application S.N. 784,281 (IBM D13049) filed in the name of J. J. Moyer on Dec. 31, 1958, entitled Switching Circuit. As may be seen from the disclosure of that application the circuit comprises a group of logic components arranged to rapidly generate a parity indication for three input values. Normally each flip-flop will apply one conditioning level to the parity circuit and the logic therein will condition two gates to pass a single appropriate indication. However if less than two conditioning levels are present no gate is conditioned and if more than two are present all four gates are conditioned. Taking advantage of this fact these circuits are utilized herein to check the presence of two conditioning levels from one flip-flop and the absence of conditioning levels from the other three flip-flops. Both conditioning levels supplied by the Displacement Control flip-flop 100 are applied as inputs to P circuit 240. The other two inputs of the parity circuit 240 are connected to the output leads from Displacement Control flip-flop 102. In like manner Displacement Control flip-flops 104 and 106 are connected to parity circuit 242. The output leads from the Displacement Control flip-flops are also applied to NOT AND circuits 244, 246 which have outputs conditioning gates 248, 250 respectively.

After a command has been issued to set up the displacement flip-flops an error checking pulse on line 252 sample gates 248, 250 an also is passed to sample corresponding gates in the other byte error checking circuitries.

As one and only one of the Displacement Control flip-flops 100, 102, 104 and 106 in each group of two bytes should be set two of the cleared flip-flops will condition one of the NOT AND circuits 244, 246 and it will have an output that conditions one of the gates 248, 250. The gate that is conditioned will pass the error check pulse to sample the parity circuit that is conditioned by levels from the other two flip-flops, one of which should be supplying two conditioning levels. If the sampled parity circuit is properly conditioned a flip-flop 258, 260 in the check register will be set. However, if the circuit has more than two of its inputs conditioned an alarm will be generated on the associated line 256 while if less than two inputs are conditioned no outputs will be produced. The outputs of the check flip-flops 258, 260 are applied to a parity circuit of the same type as parity circuits 240, 252 and the set of parity circuits associated with the check register are subsequently sampled to insure that one and only one of the flip-flops in each group of the two bytes is set. Each parity check circuit 262 should indicate that one of the associated check flip-flops is set and the other is not. An output signal on line 264 will immediately indicate an error while the output signal on line 266 is applied to the next parity circuit to check the status of the Configuration Gates and control circuitries associated therewith. As the check register is used for other purposes the line 264 is normally also connected to the next parity circuit. However this output is gated in order to more quickly pin point the source of an error.

When the word is transferred into the Exchange Register the parity of the transferred word is checked against the two half word parities that are transferred therewith and simultaneously the parities of the individual bytes are generated. The generated byte parities are then transferred over the same paths through the configuration matrix to the A Register. Byte parities thus established may be utilized with checking purposes as necessary within the Arithmetic Element.

The transfer and checking circuitries associated with each single byte in the A Register is shown in FIG. 6. The byte shown in byte 0 which includes flip-flops 140-1, 6 and P. A signal applied on line 263 clears the A Register flip-flops 140-1, 6 and sets 140 P; Displacement Control flip-flops 170 and 172 are associated with this byte and the output levels of NOT AND circuits 150 and 160 condition the gates 120 and 130 respectively. If the associated Displacement Control flip-flop is set and if the activity flip-flop is cleared (indicating byte activity) the NOT AND circuit has an output which conditions the connected set of A Register input gates. The data bits are transferred either through OR circuits 110 (indicated as a single block) or through OR circuits 115-1, 6 and P. The data bits from OR circuits 110 are applied to gates 120 while the data bits from OR circuits 115 are applied to gates 130. The outputs of both gates are applied through OR circuits 270 to the complement inputs of the flip-flops 140 (to enable certain logical functions required in some instructions to be performed). Associated with the outputs of the NOT AND circuits is checking circuitry which includes gates 274, 276, 278, 280, 282 and inverters 284 and 286. A check pulse applied on line 288 samples the gates 274 and 276 serially and an alarm signal is passed if both of the NOT AND circuits have an output. The output levels from the NOT AND circuits 150, 160 then applied through inverters 284 and 286 respectively to condition gates 278 and 280 respectively. The check pulse on line 288 is passed through gate 282 which is conditioned by an activity indicating level from flip-flop 180. Thus if the byte is active the check pulse is passed and if neither of the NOT AND circuits has an output the gates 278 and 280 which are sampled serially pass the pulse as an alarm signal. (If the byte is inactive and one of the NOT AND circuits has an output the error would be detected only 50% of the time via byte parity. This can be checked by the addition of two gates that are sampled in parallel by a check pulse gated by byte inactivity.) The accuracy of byte transfer is determined by checking the parity of each byte in the A Register against the parity bit for that byte that was generated in the Exchange Register.

The Signed Data circuitry associated with byte 0 is also illustrated in FIG. 6. As indicated above when Signed Data operation is requested (instruction bit 15 is ONE), a pulse serially samples the activity flip-flops 180-187. This pulse is applied on line 300 and samples gates 302 and 304. If the byte is inactive (the activity flip-flop being set to the ONE state) gate 302 is conditioned and the pulse is passed to sample the two gates associated with the byte 1 activity flip-flop 181. However if the byte is active gate 304 is conditioned and the pulse is passed on line 306 to set the SDT flip-flop 199. The resulting output level conditions gate 200. The sign bit of the byte being transferred into the A Register byte 0 in addition to being applied through OR circuit 270 to the flip-flop 140-1 is also applied to sample gate 200 and if it is ONE (indicating that the sign of the byte is negative) the conditioned gate 200 passes the pulse to sample gate 220 and the other corresponding gates 221-227. Wherever the byte is inactive the associated gate is conditioned and the signal is passed to the ONE inputs of the flip-flops of that byte to set them to the ONE states. (It will be recalled that where the byte is inactive the NOT AND circuits 150, 160 will not provide conditioning levels to the input gates and therefore the flip-flops in that byte initially remained in the cleared (ZERO) state.) Thus this effective complementing operation sets these flip-flops in the inactive bytes to the ONE state so that the requisite carry propagation for arithmetic operations can be correctly performed within the Arithmetic Element.

In certain instructions utilized in this computer system one or more bytes are extracted from a memory word and different or modified bytes are replaced in these positions during a single machine cycle. The bytes may be modified in the Accumulator before being restored in the original memory word or memory word bytes may be exchanged with accumulator bytes. When a byte is extracted from a memory word and displaced its destination is defined as the active byte and to replace this byte in its original location requires a revision of the A and P modifiers. This revision can be thought of as a cycle left process so that the revised A modifier will activate byte locations corresponding to those byte locations extracted from the original memory word.

Figure 7B:
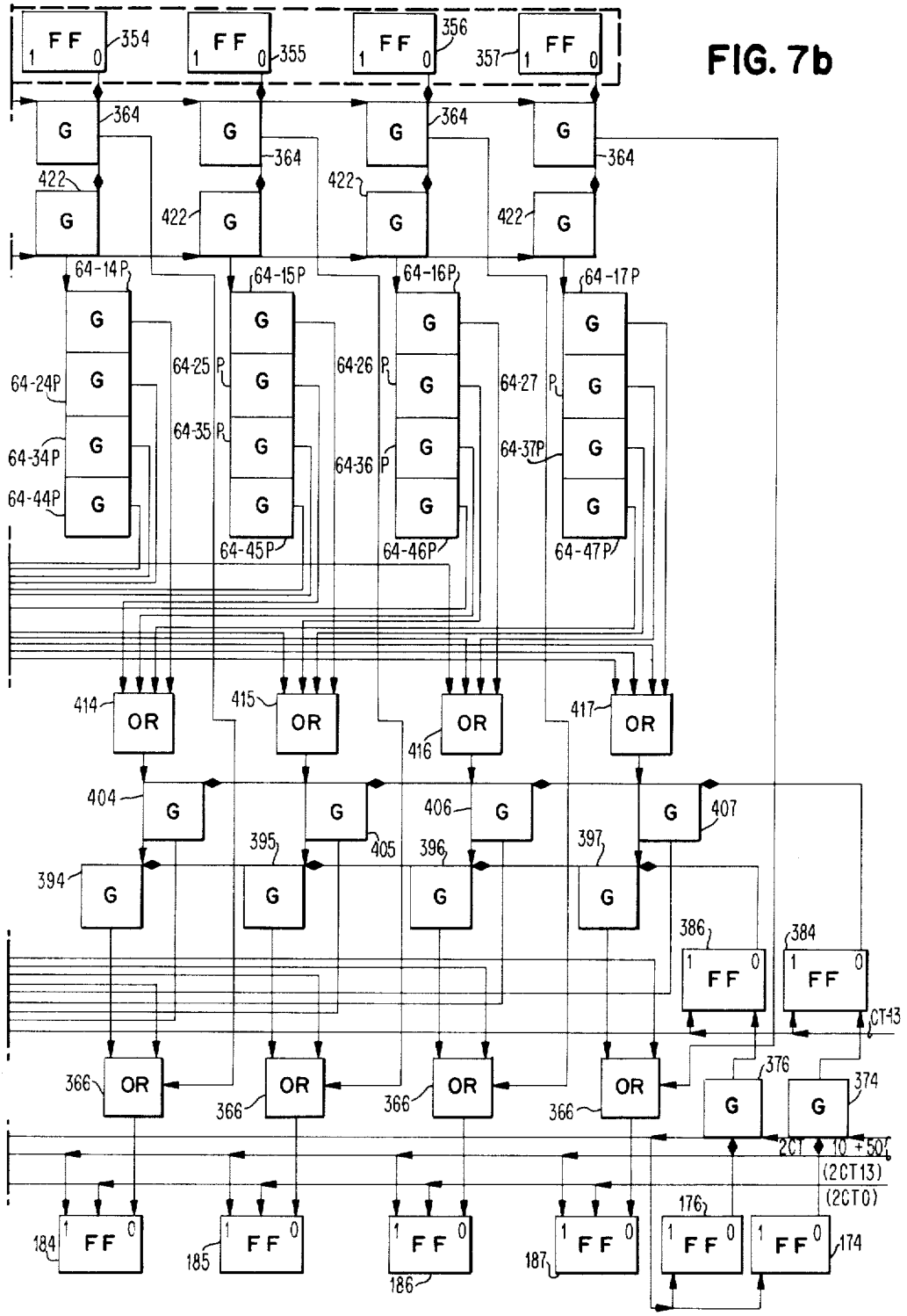
FIG. 7 is a logical block diagram of the A modifier revision circuitry.

A logical block diagram of the A modifier circuitry utilized in this operation is shown in FIG. 7. In that figure there is indicated an A modifier flip-flop register 348 which includes flip-flops 350-357 (and which forms a portion of Instruction Register 32, in the Instruction Control element 30). This register is normally loaded with bits 16-23 of the instruction word after those bits are transferred from first level (register 28) to second level (register 32) to control data manipulation operations in the arithmetic element. A command, generated shortly after the instruction is transferred from first level, is applied on line 362 to sample gates 364, transferring the A modifier through OR circuits 366 to the corresponding activity flip-flops 180-187 in the Arithmetic Element to set up those circuits in anticipation of the data transfer into the Arithmetic Element. The P, M and T modifiers are decoded in the Instruction Control element and command pulses are gated to set the byte displacement flip-flops 100, 102, 104, 106, 170, 172, 174, 176 and the SDT flip-flops 190-197 in accordance with those indications during this same time interval.

After the data word has been loaded into the Exchange Registers 52 and configured into the A Registers 54 the requisite data manipulations specified by the instruction are performed. (Suitable apparatus for performing typical data manipulations is disclosed in detail, for example, in the aforementioned Ross patent, No. 2,914,248, and in the copending application, S.N. 612,265, entitled Data Processing Machine filed in the name of M. M. Astrahan et al. on Sept. 26, 1956.) However, if there is to be an extraction or other modification of the data word so that one or more bytes are reloaded into the data word during the instruction, the settings of the activity and displacement control flip-flops must be revised. The activity flip-flops 180-187 are initially all reset to the ONE state by a command pulse applied on line 368 after the data word has been configured and loaded into the A Register. The settings of the ZERO and FOUR displacement flip-flops 170, 172, 174 and 176 are transferred through gates 370, 372, 374, 376 to the Revise flip-flops 380, 382, 384, 386 in response to a command pulse on line 388 so that the original displacement factor is retained and then the flip-flops 170, 172, 174 and 176 are cleared to prevent signals from entering the A Register during the byte activity revision process. (The SDT flip-flops 190–197 are also cleared.) The ZERO output levels from flip-flops 380, 382, 384, 386 condition the sets of gates 390–397 and 400–407 which are sampled by pulses passed from the auxiliary OR circuits 410–417. These OR circuits are connected to the byte parity portion of the normal configuration gates 64 (the byte parity portion of the gates associated with byte ZERO being designated as 64–10P, etc.) as these gates are the lightest loaded configuration gates in the system. The outputs of these gates are connected to OR circuit 410 and are arranged to provide effectively a cycle left displacement of the signals that are passed by those gates. A command is applied on line 420 to the gates 422 which are conditioned by ZERO outputs from the A modifier register 348 to apply the A modifier signals to the byte parity configuration gates portions as originally conditioned by first level displacement control flip-flops 100, 102, 104, 106 for application to the OR circuits 410. The conditioning levels for gates 390, 400 provided by flip-flops 380, 382, 384, 386 supply the requisite second level displacement control and channel the revised A modifier indication to the activity flip-flops 180–187 through OR circuits 366 in the cycle left operation. For example, if bytes 3 and 7 were active and original displacement was 2, after A modifier revision flip-flops 181 and 185 would be cleared indicating that bytes 1 and 5 are now active. These are the bytes of the original data word that were configured into A Register bytes 3 and 7.

The P modifier (bits 9–11 of the instruction) is loaded into a register in the Instruction Control element 30 which has a decoder 430 associated therewith as shown in FIG. 8. A first set of gates 432 associated with the decoder in response to a command pulse on line 434 transfers a decoded output over one of the lines in cable 436 to effect the requisite normal setting of the displacement control flip-flops. A second set of gates 438 associated with the decoder provides the displacement revision signal which revises the setting of the displacement control flip-flops in response to a pulse on line 440. This revision is to the Ns complement value of the original P modifier where N is the radix in which the information is encoded. Thus in the instant case the revised P modifier is the 2s complement value of the original P modifier. For example, with this three bit value, if the original displacement was ZERO the revised displacement would also be ZERO; if the original displacement was ONE the revised displacement would be SEVEN, etc. A command pulse on line 442 causes the displacement flip-flops to be set to ZERO displacement.

Examples of instructions which utilize this configuration and revision circuitry are the Add One (AOR) instruction and the Add to Register (ATR) instruction. The AOR instruction is used to add a value of ONE to specified locations in either or both halves of a data word, depending on the mode selected. For example, two bytes may be incremented at the same time. After the selected portion(s) of the data word has been incremented the incremented portion is returned to the same position in the data word. That is, if byte 1 was specified by the instruction to be incremented it would be placed in either byte 3 or byte 7 (since the addition may take place at only bit 23 and/or 47 of the Adder 60). The value ONE previously placed in the Accumulator 56 is added to it, and the modified byte is then returned to the byte 1 position. In similar manner any value placed in the Accumulator may be added to a specified byte or bytes and those modified bytes returned to their original locations by the ATR instruction. These instructions thus must make a dual reference to the A and P modifiers since it is necessary to store the byte back into the byte position from which it was obtained before modifications and the operation is accomplished by the above described automatic revision of the A and P modifiers during the instruction.

As an example of the AOR instruction assume that the A modifier is 11101111 (357), the P modifier equals 2, the M modifier equals 1 (left half only) and the T modifier is 0 (inactive). As a result of the instruction the data word would be loaded into the Exchange Register and simultaneously byte 1 of the data word would be cycled to byte 3 of the A Register through the Configuration circuitry. All the other bytes of the A Register are inactive. The value ONE has been placed in bit 23 of the otherwise cleared Accumulator and the quantity in the A Register is added to the contents of the Accumulator to produce the modified byte. While this is being accomplished the A and P modifiers are revised and the data word (without byte 0) is transferred into the A Register with zero displacement. The modified byte is then transferred from byte 3 of the Accumulator to the Exchange Register and simultaneously configured into byte 1 of the A Register. Thus a byte has been extracted, configured, modified and reinserted in the data word in its original location by a single instruction. Other instructions provided in the computer utilize this circuitry in related manners for similar operations.

The following table indicates the timing of the several commands that are generated to accomplish this data manipulation in the AOR instruction. The timing is referenced to time pulses 0–15 or specific time pulses delayed by a stated number of millimicroseconds as 9+50 (meaning Time Pulse 9 delayed (plus) 50 millimicroseconds). The Memory cycles commence with TP0 while machine cyces commence with TP6 (after the word has been transferred from Memory). (Certain commands which relate to the execution of the instruction decoding, indexing and data manipulations and those commands which accomplish the checking operations in the computer system have been omitted from this listing, additional information relative to such computer control being obtainable from the abovementioned copending patent application and patent references if desired.

| Command Time | | Function |
|---|---|---|
| 1st level | 2nd level | |
| 0 | | Initiate Instruction-In cycle. |
| 0–15 | | Instruction in operations and address modification. |
| 0 | | Initiate data-in cycle. |
| 0 | | Initiate 1st to 2nd level transfer. |
| | 3 | Transfer A modifier to A modifier register, Sense P modifier to set Displacement-control FF's, Sense M and T modifiers to set SDT-control FF's. |
| | 4 | Sense M modifier to set Mode-control FF's. |
| | 6–9 | Transfer of data to Exchange Register and A Register. |
| | 9+50 | Add A Register to Accumulator according to Mode. |
| | 10+50 | Set A modifier to 11111111. Set Revise 0+4 FF's. |
| | 11 | Clear SDT-control FF's. |
| | 11+50 | Transfer A modifier to A modifier register through the revise displacement gates. |
| | 13 | Clear A Register-all bytes, Complement A modifier register, Clear Revise 0+4 FF's, Set displacement=0. |
| | 14 | Transfer Exchange Register to A Register. |
| | 15 | Sense P modifier revise gates to set Displacement-control FF's. |
| 0 | | Complement A modifier register, Clear Exchange Register. |
| 1 | | Transfer Accumulator to Exchange Register and A Register. |

The command pulses which affect this revision are indicated in FIGS. 7 and 8 as 1CT3 (first level, time pulse 3), 2CT13 (second level, time pulse 13), etc.

As indicated above, configuration control also enables byte displacement between the Exchange Register and the A Register through the OR circuits 74 (FIG. 1) which connect the Exchange Registers to the Configuration Gates. While the setting of displacement and activity flip-flops has been described in response to the A and P modifiers it should be understood that these control flip-flops may be set by raw commands or by other modifiers, for example, if such operation is desired.

A "clear by byte" operation is enabled with this circuitry by establishing a desired activity condition and then sensing gates on the ZERO sides of the activity flip-flops 180–187. Each conditioned gate passes a pulse that clears the flip-flops of the associated byte in the A Register. This operation is checked by applying the clearing pulses to the displacement check register (flip-flops 258, 260 etc.) where parity is counted and matched against the parity indicated by the A modifier parity flip-flop which indicates the parity of the established activity condition. A control flip-flop is utilized to determine whether the parity check in this register is a displacement check or a clear by byte check.

As indicated above, configuration control may invalidate the half word parity assigned to the memory word as loaded into the Exchange Register and therefore individual parity bits are generated for each byte in the Exchange Register and then sent through the Configuration Gates over the same path to the A Register. The byte parity of the configuration in the A Register is then checked and new half word parities are established from that information.

The error check operation on the Sign Data Tag operation checks the setting of SDT flip-flops 190–197. In full mode, left mode and right mode operations one and only one SDT flip-flop should be set while in dual mode and twin mode operations two SDT flip-flops (one for each half word) should be set. When the SDT modifier (instruction bit 15) is ONE it is assumed that there is at least one active byte per operative word portion. A logical block diagram of the SDT error check circuitry is shown in FIG. 9. The SDT sampling pulse samples gates 302, 304 as indicated above and if byte activity is indicated a pulse is passed through an OR circuit 310 to set SDT activity control flip-flop 312. The flip-flops illustrated in FIG. 9 are associated with the right half A Register word (bytes 4–7). If the mode is right half word mode, dual or twin, the SDT sampling pulse is applied on line 314 through OR circuit 316 to sample gates 302, 304. However if full mode operation is specified the full mode flip-flop 318 is set conditioning gate 320 and the serial SDT sampling pulse applied on line 300 is applied through gate 320 if there are no active bytes in the left half word A register word to OR circuit 316. The outputs of the SDT flip-flops 190–197 are applied to a chain of parity circuits 322 and a parity check is run on the contents of these flip-flops. A check pulse is applied on line 324 in right, dual and twin mode operation to the parity circuits 322. The parity chain output samples the SDT control flip-flop 312 via gates 326 and 328. The "odd" output of the parity chain indicating an odd number of SDT flip-flops are set, samples the ZERO side of control flip-flop 312 and the "even" output samples the ONE side. If there was SDT activity gate 328 will be conditioned and should a pulse emanate from the parity chain on the Even line a signal will be passed through OR circuit 330 to generate an alarm. Similarly an ODD output of the parity chain indicates that one flip-flop was set and if gate 326 is conditioned an alarm is generated because there was no SDT activity. On full mode operation a pulse serially samples both the left and right control flip-flops 312 via mode control gate 332 and gate 334. If both control flip-flops are set the pulse is passed to OR circuit 330 to generate an alarm as only one half word should contain an active Signed Data tag bit in full mode operation.

Thus it will be seen that the invention provides a high speed data configuration system in which data is retained in a first register in the form that it was transferred while being configured into a second register on a byte basis with selected bytes thereof rendered inactive in accordance with instruction tag information. The transfer of data to the second register is controlled by a two level configuration system which enables flexible cycling of data and versatility in data extraction and similar manipulations. The second level of configuration utilizes input gates which are capable of being selectively conditioned so that versatile twinning operations may be performed and byte activity is easily controlled. In addition the circuitry includes provision for correcting the indication of the inactive bytes so that arithmetic operations involved signed data may be accurately performed. Thus the invention provides a flexible data manipulating system which finds particular use in arithmetic elements of large digital computers. Due to the difficulty in reconstructing erroneously configured data at a later time comprehensive error check circuitry is also associated with the manipulation circuitry. It will be seen by those having ordinary skill in the art that the invention may be practiced in various manners and with a variety of circuit arrangements. Therefore while a preferred embodiment of the invention has been shown and described it will be understood that the invention is not intended to be limited thereto or to details thereof and departures may be made therefrom within the spirit and scope of the invention as defined in the claims.

We claim:

1. In a data processing machine data manipulation apparatus comprising first and second registers, each said register including a like number of corresponding multi-digit sections, means providing transmission paths between each section of said first register and all the sections of said second register, gating means associated with each said transmission path, means to selectively energize said gating means to permit transmission of multidigit portions of a data word from said first register to said second register so that the transmitted multidigit portions are correspondingly cycled relative to their location in said first register and loaded into said second register in cycled relationship, and means for selectively inhibiting entry of a multi-digit portion of the transmitted data word into a section of said second register.

2. In a data processing machine, data manipulation apparatus comprising data word storage means having a plurality of multidigit sections, data entry gate means associated with each said section for controlling entry of data into the section, a plurality of transmission paths connected to the entry gate means associated with each said section, first selection means for selecting a set of transmission paths so data portions may be correspondingly cycled for application to said storage sections, and entry gate selection means operative in conjunction with said first selection means to inhibit entry of a data portion in the associated sections.

3. The apparatus as claimed in claim 2 wherein said entry gate means includes first and second gates associated with each section and said entry gate selection means is adapted normally to select only said first gates or said second gates, and further including means to operate said entry gate selection means to select first gates associated with certain sections and second gates associated with the other sections to provide duplicate entry of data into sections of said storage means.

4. The apparatus as claimed in claim 3 wherein said storage means is divided into two halves, and said entry gate selection means includes two bistable devices associated with each half, an activity controlling device associated with each section, and a coincidence circuit associated with each section, each gate being conditioned to pass data for entry into said storage means when an enabling input is applied to the associated coincidence circuit from an associated activity controlling device and from one of said bistable devices, and means to set one bistable device associated with each storage means half to provide enabling inputs for the associated coincidence circuits, said activity controlling devices being set in accordance with said section activity information.

5. In a data processing machine, a data word storage register adapted to store binary coded signals representative of data, said register having a plurality of multibit sections, a set of configuration gates corresponding to each section adapted to enable the selective cycling of multibit groups of data for entry into said register, entry gates for controlling entry of data into said register, a data transfer path between each configuration gate and said register via an entry gate, means to select corresponding configuration gates in all of said sets to cycle data in accordance with a predetermined data displacement factor, and selection means adapted to selectively condition said entry gates to enable entry of the data cycled by said configuration gates into said register.

6. The apparatus as claimed in claim 5 wherein said entry gates include first and second gates associated with each section, said register is divided into two halves, and said entry gate selection means includes two bistable devices associated with each half, an activity controlling device associated with each section, and a coincidence circuit associated with each gate, each gate being conditioned to pass data for entry into said register when an enabling input is applied to the associated coincidence circuit from an associated activity controlling device and from one of said bistable devices, and means to set one bistable device associated with each register half to provide enabling inputs for the associated coincidence circuits for conditioning selected ones of said gates to enable entry of said data into said register.

7. In a data processing machine operable in accordance with a stored program of instructions, an arithmetic element adapted to process data words in accordance with said instructions, each said data word being divided into a plurality of multi-bit sections, a data word register in said arithmetic element, means responsive to an instruction to transfer a data word to said arithmetic element for loading into said register, first means responsive to tag information associated with said instruction operative selectively to cycle said data word as a unit relative to its original position and to load said cycled data word into said register for processing in said arithmetic element, and second means responsive to tag information associated with said instruction operative to inhibit transfer of a section of said cycled data word to a selected location in said register.

8. The apparatus as claimed in claim 7 wherein said arithmetic element is adapted to process data in accord- and further including third means responsive to instruction tag information operative to adjust the data values in those register locations to which data transfer was inhibited.

9. In a data processing machine operable in accordance with a stored program of instructions, an arithmetic element adapted to process data words in accordance with said instructions, each said data word being divided into a plurality of sections, each said section having an equal number of bits in it, a data word register in said arithmetic element, means responsive to an instruction to transfer a data word to said arithmetic element for loading into said register, and first means responsive to tag information associated with said instruction operative to inhibit transfer of a section of said data word to a selected location in said register for processing in said arithmetic element.

10. The apparatus as claimed in claim 9 wherein said arithmetic element is adapted to process data in accordance with sign information associated with the data words and further including second means responsive to instruction tag information operative to adjust the data values in those register locations to which data transfer was inhibited.

11. In a data processing machine operable in accordance with sign information associated with the data words ance with a stored program of instructions, apparatus for manipulating data words in response to a single instruction, each data word being arranged in a plurality of multibit bytes, comprising means for storing an instruction having a first portion specifying the data manipulation to be performed, a second portion specifying the data word to be manipulated, and at least one tag information portion, a register adapted to receive the data word to be manipulated in accordance with the instruction, gating control means corresponding to each byte connected to the input of said register for controlling the transfer of data to said register, means to apply the data specified by said second portion to said gating control means, means operative in response to an instruction tag information portion to actuate each said gating control means to selectively cycle said bytes such that they may be displaced relative to their arrangement as presented to said gating control means for loading into said register.

12. The apparatus as claimed in claim 11 wherein said gating control means includes first and second sets of control means associated with each byte, said first and second sets being arranged serially to pass the presented data bytes to byte portions of said register, said first set being arranged to enable a first selective displacement of said bytes and said second set being arranged to enable a second displacement of a magnitude greater than the maximum enabled by said first set.

13. The apparatus as claimed in claim 12 and further including byte activity controlling means associated with each register byte, said byte activity controlling means being adapted selectively to control operation of the second set of control means of the corresponding byte to inhibit operation thereof in response to a tag information portion to prevent transfer of a data byte to the associated byte section of said register.

14. The apparatus as claimed in claim 12 wherein said second level of control means includes two sets of gating means, and further including means responsive to a tag information portion to normally select one set of said gating means, and alternatively operative means to select portions of both of said sets of gating means to enable twinning entry of data into said register.

15. The apparatus as claimed in claim 11 and further including byte activity controlling means responsive to a second portion of instruction tag information associated with each register byte, said byte activity controlling means being adapted selectively to control operation of said corresponding byte and gating control means to inhibit transfer of data bytes to the associated byte section of said register.

16. The apparatus as claimed in claim 15 wherein said data processing machine is adapted to process data in accordance with sign information associated with said data words and further including means operative in response to a third portion of instruction tag information to sense the significant sign digit of the bytes transferred to said register and to adjust the values in the register bytes to which data transfer was inhibited by said byte activity controlling means according to the value of said sensed sign digit.

17. In a data processing machine operable in accordance with a stored program of instructions, apparatus for manipulating data words in response to a single instruction, each data word being arranged in a plurality of multibit bytes, comprising means for storing an instruction having a first portion specifying the data manipulation to be performed, a second portion specifying the data word to be manipulated, and at least one tag information portion, a register adapted to receive the data word to be manipulated in accordance with the instruction, byte activity gating control means corresponding to each byte connected to the input of said register for controlling the transfer of data to said register, means to apply the data specified by said second portion to said gating control means, means operative in response to an instruction tag information portion to actuate said control means selectively to inhibit transfer of data bytes to the corresponding register byte sections.

18. The apparatus as claimed in claim 17 wherein said data processing machine is adapted to process data in accordance with sign information associated with said data words and further including means operative in response to an instruction tag information portion to sense the significant sign digit of the bytes transferred to said register and to adjust the values in the register bytes to which data transfer was inhibited by said byte activity control means according to the value of said sensed sign digit.

19. In a data processing machine operable in accordance with a stored program of instructions, an arithmetic element adapted to process data words in accordance with said instructions, first and second data word registers in said arithmetic element, means responsive to an instruction to transfer a data word to said arithmetic element for loading directly into said first register, activity control means for selecting portions of said data word, displacement control means for shifting and loading the selected portions to positions in said second register suitable for manipulation in said arithmetic element in accordance with said instruction to modify said selected portions, and means to revise said displacement control and activity control means for loading the modified selected portions into their original locations in said data word.

20. The apparatus as claimed in claim 19 wherein said second register is divided into byte sections and said activity control means includes a bistable device associated with each byte section of said second register, each bistable device when in a first state permitting transfer of a data byte to the associated section of said second register and when in a second state inhibiting the transfer of a data byte to that section.

21. Data processing apparatus including a first register adapted to store a data word, an arithmetic unit for data manipulations, a second register associated with said arithmetic unit adapted to receive selected portions of said data word in shifted locations relative to their positions in said first register, means for modifying the selected portions loaded into said second register, means for transferring the word in said first register to said second register in its original form and means to shift the modified selected portions and load them into their original locations in said data word in said second register.

22. In a data processing machine operable in accordance with a stored program of instructions, apparatus for selectively modifying a portion of a data word in response to a single instruction, comprising means for storing an instruction having a first portion specifying the data modification to be performed, and a second portion specifying the data word, a portion of which is to be modified, a first register adapted to store the data word in its original form, a second register adapted to receive the portion of the data word to be modified, control circuitry associated with said second register adapted to control entry of said data portion into said second register, a third register for holding data to be used in the modification operation, first means responsive to said single instruction to transfer the specified data word to said first register and the data portion of said data word to be modified to said second register, second means responsive to said single instruction to combine the contents of said second register with the contents of said third register in a modification operation to produce a modified data portion, and third means responsive to said single instruction to return said modified data portion to the original location of said data portion in said data word.

23. The apparatus as claimed in claim 22 and further including configuration control means adapted to cycle said data word for entry into said second register with a displacement factor determined by said single instruction relative to its position in said first register, fourth means responsive to said single instruction to transfer said data word from said first register to said second register without displacement after said modification operation, and fifth means responsive to said single instruction to revise said configuration control means and said entry control means in accordance with said displacement factor, said third means being operative to transfer said modified data portion to said second register in accordance with said revised configuration control means and entry control means.

24. In a data processing machine adapted to manipulate data words arranged in a plurality of multidigit groups, apparatus for modifying selected groups of a data word and returning them to their original locations in said data word comprising memory means for storing said data words, a first register for storing a data word in its original form, configuration gate means for cycling a data word, a second register for storing the cycled data word, said second register having a section corresponding to each said multidigit group, section activity controlling means associated with said second register for controlling entry of sections of said cycled data word into said second register, data manipulation apparatus including an adder associated with said second register, means for applying a word transferred from said memory means simultaneously to said first register and through said configuration gate means to said second register, means for modifying the data groups entered into said second register with said data manipulation apparatus, means for revising the section activity controlling means as a function of the displacement provided by the configuration apparatus, means for transferring the data word stored in said first register to said second register without cycling for storage in its original format, means for revising the displacement factor provided by said configuration gate means, and means for transferring the modified groups through said revised configuration gate means to said second register to return said groups to the original locations in said data word.

25. In a data processing machine operable in accordance with a stored program of instructions,
   apparatus for manipulating data words in response to a single instruction,
   each data word being arranged in a plurality of multibit bytes,
   comprising means for storing an instruction having a first portion specifying the data manipulation to be performed,
   a second portion specifying the data word to be manipulated,
   and at least one tag portion,
   an arithmetic element adapted to process data words in accordance with said instructions,
   first and second data word registers in said arithmetic element,
   each said register being divided into a corresponding plurality of multibit sections,
   a plurality of transmission paths connected to each section of said second register,
   entry gate means for controlling the entry of data into each section of said second register over said transmission paths in response to an instruction tag portion to cycle a data word entering said arithmetic element in accordance with a predetermined displacement factor,
   said entry gate means including first and second gating means associated with each section,
   said first gating means selecting a set of transmission paths,
   and said second gating means selectively enabling entry of data passed by said first gating means into said second register,
   and means responsive to an instruction to apply a data word in parallel to said arithmetic unit for loading into said first register in unmodified form and simultaneously for transmission through said entry gate means for loading into said second register in modified form in accordance with said tag portion of said instruction.

26. In a data processing machine operable in accordance with a stored program of instructions,
apparatus for manipulating data words in response to a single instruction,
each data word being arranged in a plurality of multibit bytes,
comprising means for storing an instruction having a first portion specifying the data manipulation to be performed,
a second portion specifying the data word to be manipulated,
and at least three instruction tag portions,
an arithmetic element adapted to process data words in accordance with said instructions,
first and second data word registers in said arithmetic element,
each said register being divided into a corresponding plurality of byte sections,
a plurality of transmission paths connected to each section of said second register,
entry gate means for controlling the entry of data into each section of said second register over said transmission paths in response to a first instruction tag portion to cycle a data word entering said arithmetic element in accordance with a predetermined displacement factor,
said entry gate means including first and second gating means associated with each section,
said first gating means selecting a set of transmission paths,
and said second gating means selectively enabling entry of data passed by said first gating means into said second register,
byte activity control means responsive to a second instruction tag portion and cooperating with said second gating means to control entry of the cycled data word into each byte section of said second register,
means operative in accordance with a third instruction tag portion to adjust data values in second register byte sections to which data transfer was inhibited by said byte activity control means so that arithmetic operations within the arithmetic element may be properly executed,
and means responsive to an instruction to apply a data word in parallel to said arithmetic unit for loading into said first register in unmodified form and simultaneously for transmission through said entry gate means for loading into said second register in modified form in accordance with said first, second and third tag portions of said instruction.

27. In a data processing machine operable in accordance with a stored program of instructions, an arithmetic element adapted to process data words in accordance with said instructions,
each said data word being divided into a plurality of sections,
a data word register in said arithmetic element,
means responsive to an instruction to transfer data word to said arithmetic element for loading into said register,
and cycle means responsive to tag information associated with said instruction for selectively cycling said data word as a unit relative to its original position and loading said cycled data word into said register for processing in said arithmetic element,
said cycle means including a plurality of transmission paths for receiving each section of said data word and transmitting said word section to shifted locations in said register so that the sections of said data word may be cycled relative to their original locations,
first and second levels of control associated with said transmission paths,
said first level of control adapted to selectively provide an initial displacement,
and said second level of control adapted to selectively provide a displacement of magnitude greater than the maximum provided by said first level of control.

28. The apparatus as claimed in claim 27 wherein said second level of controls includes two sets of gating means, and further including means to normally select one set of said gating means, and alternatively operative means to select portions of both of said sets of gating means to enable twinning entry of data into said register.

29. In a data processing machine, data manipulation apparatus comprising data word storage means having a plurality of multidigit sections, data entry gate means associated with each said section for controlling entry of data into the section, said entry gate means including first and second gates associated with each section, a plurality of transmission paths connected to the entry gate means associated with each said section, selection means for selecting a set of transmission paths so data portions may be correspondingly cycled for application to said storage sections, entry gate selection means operative in conjunction with said selection means normally to select only said first gates or said second gates, and means to operate said entry gate selection means to select first gates associated with certain sections and second gates associated with the other sections to provide duplicate entry of data into sections of said storage means.

References Cited by the Examiner

UNITED STATES PATENTS

| | | | |
|---|---|---|---|
| 2,866,177 | 12/1958 | Steele | 340—172.5 |
| 2,936,115 | 5/1960 | Alexander et al. | 235—164 |
| 3,076,181 | 1/1963 | Newhouse et al. | 340—174 |
| 3,109,162 | 10/1963 | Wolensky | 340—172.5 |

OTHER REFERENCES

Brooks et al.: Processing Data in Bits and Pieces, IRE Transactions, vol. EC 8, No. 2, pp. 118 to 124, June 1959.

ROBERT C. BAILEY, *Primary Examiner.*

WALTER W. BURNS, JR., MALCOLM A. MORRISON,
*Examiners.*

UNITED STATES PATENT OFFICE
CERTIFICATE OF CORRECTION

Patent No. 3,228,005            January 4, 1966

James W. Delmege, Jr., et al.

It is hereby certified that error appears in the above numbered patent requiring correction and that the said Letters Patent should read as corrected below.

Column 2, line 16, for "invnetion" read -- invention --; column 8, line 56, for "an" read -- and --; column 12, line 30, for "cyces" read -- cycles --; column 13, line 24, for "parties" read -- parities --; column 15, line 46, after "accord-" insert -- ance with sign information associated with the data words --; line 73, strike out "ance with sign information associated with the data words --.

Signed and sealed this 10th day of January 1967.

(SEAL)
Attest:

ERNEST W. SWIDER            EDWARD J. BRENNER
Attesting Officer            Commissioner of Patents